United States Patent
Mo et al.

(10) Patent No.: US 8,300,722 B2
(45) Date of Patent: Oct. 30, 2012

(54) RETRANSMISSION OF DATA IN A MULTIPLE INPUT MULTIPLE OUTPUT (MIMO) SYSTEM

(75) Inventors: Ronghong Mo, Singapore (SG); Ping Luo, Singapore (SG); Poy Boon Tan, Singapore (SG); Katsuhiko Hiramatsu, Kanagawa (JP)

(73) Assignee: Panasonic Corporation (JP)

( * ) Notice: Subject to any disclaimer, the term of this patent is extended or adjusted under 35 U.S.C. 154(b) by 769 days.

(21) Appl. No.: 12/305,294

(22) PCT Filed: Jun. 23, 2006

(86) PCT No.: PCT/SG2006/000168
§ 371 (c)(1),
(2), (4) Date: Jul. 22, 2009

(87) PCT Pub. No.: WO2007/149048
PCT Pub. Date: Dec. 27, 2007

(65) Prior Publication Data
US 2010/0014601 A1    Jan. 21, 2010

(51) Int. Cl.
*H04B 7/02* (2006.01)
(52) U.S. Cl. ......................................... 375/267
(58) Field of Classification Search .................. 375/262, 375/267, 299, 340, 346–347; 370/334; 455/7, 455/101
See application file for complete search history.

(56) References Cited

U.S. PATENT DOCUMENTS

| | | | |
|---|---|---|---|
| 7,031,419 B2 * | 4/2006 | Piirainen | 375/358 |
| 7,522,673 B2 * | 4/2009 | Giannakis et al. | 375/267 |
| 2005/0117520 A1 * | 6/2005 | Miyoshi | 370/238 |
| 2005/0249304 A1 | 11/2005 | Takano et al. | |
| 2005/0249306 A1 | 11/2005 | Chae et al. | |
| 2005/0255805 A1 * | 11/2005 | Hottinen | 455/8 |
| 2006/0107167 A1 | 5/2006 | Jeong et al. | |
| 2006/0176993 A1 * | 8/2006 | Kwun et al. | 375/367 |
| 2009/0279631 A1 * | 11/2009 | Chen et al. | 375/267 |

FOREIGN PATENT DOCUMENTS

EP    1594245 A2    11/2005

OTHER PUBLICATIONS

Tarokh, V., et al., 'Space-time block codes from orthogonal designs', IEEE Transactions on information theory, vol. 45, Jul. 1999, pp. 1456-1467.
Wolniansky, et al., 'URSI International Symposium on Signals, Systems and Electronics', Pisa Italy, Sep. 29 to Oct. 2, 1988.

* cited by examiner

*Primary Examiner* — Khanh C Tran
(74) *Attorney, Agent, or Firm* — Woodcock Washburn LLP

(57) ABSTRACT

A method for retransmission of data in a multiple input multiple output (MIMO) system, the method comprising space-time block code (STBC) encoding multiple data streams including one or more retransmission data streams using a STBC matrix, the STBC matrix multiplying at least one of the retransmission data streams with respective variable weighting factors.

18 Claims, 10 Drawing Sheets

RETRANSMISSION OF DATA IN A MULTIPLE INPUT MULTIPLE OUTPUT (MIMO) SYSTEM

FIELD OF INVENTION

The invention relates broadly to a method for retransmission of data in a multiple input multiple output (MIMO) system, a method for receiving data in a MIMO system, a transmitter for retransmitting data in a MIMO system and a receiver for receiving data in a MIMO system.

BACKGROUND

In the field of wireless communications, the hybrid automatic repeat request (HARQ) technique is typically used in a wireless communication system to resend data packets that cannot be decoded successfully to improve the system throughput. A HARQ process is activated when a new data packet is transmitted. In a typical implementation of the HARQ process, each data packet to be transmitted by a transmitter is attached with a cyclic redundancy check (CRC) code for error detection. At a receiver, the contents of each received packet are validated using CRC. If the received packet fails the CRC validation, the receiver sends a non-acknowledgment (NACK) signal back to the transmitter to request for a retransmission. The packets are retransmitted until either they are decoded successfully or until the maximum number of retransmissions (e.g. 4 retransmissions) is reached. Otherwise, if the received packet is successfully validated using the CRC validation, an acknowledgement (ACK) signal is sent back to the transmitter to acknowledge correct decoding of the data packets. At the receiver, the received retransmitted packets and the received originally transmitted packets are combined to improve the system throughput.

Using current technologies, there are two typical protocols used to implement the HARQ process, a Chase combining protocol and an Incremental Redundancy (IR) protocol. Using the Chase combining protocol, a data packet (ie. a Chase packet) substantially identical to an originally transmitted data packet which contains system information and some parity information, is retransmitted by the transmitter when it receives a retransmission request. On the other hand, using the IR protocol, the transmitter transmits a data packet comprising system information and some parity information in the initial transmission. When the initial data packet fails the CRC validation and retransmission is requested, more parity information is typically transmitted in a retransmitted packet (ie. an IR packet) to provide more redundancy to assist in decoding of the system information. The parity information in the retransmitted packet is different from the parity information contained in the originally transmitted packet. Based on the above, in contrast to the Chase combining protocol, the retransmitted IR packet is not a repetition of the originally transmitted packet.

With regards to the capacity of the wireless communication system, the capacity is typically enhanced by using simultaneous transmissions of multiple data streams in a multiple input multiple output (MIMO) communication system that employs multiple transmit ($N_T$) antennas and multiple receive ($N_R$) antennas. The MIMO system is typically configured either to improve performance through transmit diversity or to increase system capacity by using spatial multiplexing (SM).

Transmit diversity is typically achieved by using space-time block coding (STBC) which provides space and time diversity. The STBC is described in "Space-Time Block Codes from Orthogonal Designs", IEEE Transactions on information theory, Vol. 45, pp. 1456-1467, July 1999 (by Tarokh, V., Jafarkhani, H., Calderbank, A. R.) and in WO 99/15871. Increasing system capacity by using SM is described in "V-BLAST: an architecture for realising very high data rates over the rich-scattering wireless channel" in the published papers of the 1998 URSI International Symposium on Signals, Systems and Electronics, Pisa, Italy, Sep. 29 to Oct. 2, 1998 (by P W Wolniansky et al.).

In addition, MIMO techniques are typically used in conjunction with orthogonal frequency division multiplexing (OFDM) to achieve more efficient spectral utilization by transferring frequency selective fading channels into a set of parallel frequency-flat fading and orthogonal subchannels overlapping each other.

In the MIMO system, when multiple data streams are transmitted in parallel over multiple antennas using spatial multiplexing, data streams transmitted over different antennas typically have different error performances since the streams experience different link conditions. It has been recognised that it is typically unlikely that the data streams experience detection errors simultaneously, especially when a large number of antennas are employed. This antenna diversity may be used to further improve the system throughput of the MIMO system by employing an antenna-dependent HARQ technique. The antenna-dependent HARQ technique comprises using independent HARQ processes for independent data streams transmitted over different antennas. At the receiver, each received data stream may go through an independent CRC validation. Multiple ACK/NACK indications may then be sent by the receiver back to the transmitter. The transmitter may retransmit data streams based on the ACK/NACK indications. Hence, in this way, the system throughput of the MIMO system may be further increased since only the transmit antennas receiving NACK feedback signals retransmit packets while the transmit antennas receiving ACK feedback signals transmit new packets.

However, since the link conditions may not vary at a fast rate over two consecutive transmission intervals, the transmission quality of the data stream which fails the CRC validation in the previous transmission may not be improved. Hence, in the antenna dependent HARQ retransmission scheme discussed above, one critical issue is that a higher number of retransmissions may be required to achieve successful decoding and CRC validation of the system information.

To improve the transmission quality of the retransmitted data streams when the above antenna dependent HARQ technique is used, the retransmitted data streams and the newly transmitted data streams may be encoded using STBC to take advantage of the transmit diversity typically offered by STBC. The STBC encoding may improve the transmission quality of both the data streams to be retransmitted and the new data streams.

In view of the above, preferred embodiments of the present invention described herein provide a method for retransmission of data in a MIMO system to address at least the issue.

SUMMARY

In accordance with a first aspect of the present invention, there is provided a method for retransmission of data in a multiple input multiple output (MIMO) system, the method comprising space-time block code (STBC) encoding multiple data streams including one or more retransmission data streams using a STBC matrix, the STBC matrix multiplying at least one of the retransmission data streams with respective variable weighting factors.

The variable weighting factors may be selected such that the associated retransmission data streams are given a weight equal to or greater than one in the STBC encoding.

The STBC matrix may further multiply new data streams with respective variable weighting factors, and the variable weighting factors may be selected such that the associated new data streams are given a weight less than one in the STBC encoding.

The variable weighting factors associated with the respective retransmission signals may be selected based on link conditions between respective transmitter and receiver antenna pairs of the MIMO system.

The weighting factors associated with the respective retransmission signals may be selected based on measured signal to noise ratios (SNRs) of originally transmitted data streams detected at a receiver.

The STBC encoding may comprise a rate one STBC code.

The STBC encoding may comprise a rate two STBC code.

The multiple data streams may include one or more retransmission data streams and one or more new transmission data streams, and antennas used to transmit the STBC encoded data streams may be selected such that the antennas are least correlated.

In accordance with a second aspect of the present invention, there is provided a method for receiving data in a multiple input multiple output (MIMO) system, the method comprising utilising a retransmission packet processing based on decoding space-time block code (STBC) encoded multiple data streams including one or more retransmission data streams, wherein a STBC matrix used in the STBC encoding multiplies at least one of the retransmission data streams with respective variable weighting factors.

In accordance with a third aspect of the present invention, there is provided a transmitter for retransmitting data in a multiple input multiple output (MIMO) system, the transmitter comprising a transmitter control module utilising space-time block code (STBC) for encoding multiple data streams including one or more retransmission data streams using a STBC matrix, the STBC matrix multiplying at least one of the retransmission data streams with respective variable weighting factors.

The transmitter control module may select the variable weighting factors such that the associated retransmission data streams are given a weight equal to or greater than one in the STBC encoding.

The STBC matrix may further multiply new data streams with respective variable weighting factors, and the variable weighting factors may be selected such that the associated new data streams are given a weight less than one in the STBC encoding.

The variable weighting factors associated with the respective retransmission signals may be selected based on link conditions between respective transmitter and receiver antenna pairs of the MIMO system.

The weighting factors associated with the respective retransmission signals may be selected based on measured signal to noise ratios (SNRs) of originally transmitted data streams detected at a receiver.

The STBC encoding may comprise a rate one STBC code.

The STBC encoding may comprise a rate two STBC code.

The multiple data streams may include one or more retransmission data streams and one or more new data streams, and antennas used to transmit the STBC encoded data streams may be selected such that the antennas are least correlated.

In accordance with a fourth aspect of the present invention, there is provided a receiver for receiving data in a multiple input multiple output (MIMO) system, the receiver comprising a receiver control module for retransmission packet processing based on decoding space-time block code (STBC) encoded multiple data streams including one or more retransmission data streams, wherein a STBC matrix used in the STBC encoding multiplies at least one of the retransmission data streams with respective variable weighting factors.

BRIEF DESCRIPTION OF THE DRAWINGS

Embodiments of the invention will be better understood and readily apparent to one of ordinary skills in the art from the following written description, by way of example only, and in conjunction with the drawings, in which.

DETAILED DESCRIPTION

In the following, an example implementation for retransmitting data in a MIMO system is first described with respective broad descriptions of a transmitter and a receiver in the MIMO system below followed by a detailed description of the example implementation. In the example implementation, a method for retransmission of data in the MIMO system is provided which comprises space-time block code (STBC) encoding multiple data streams including at least one or more retransmission data streams using a STBC matrix, the STBC matrix multiplying at least one of the retransmission data streams with respective variable weighting factors.

It would be appreciated by a person skilled in the art that although the transmitter and the receiver are broadly described to each comprise two transmit and receive antennas respectively, the example implementation may be applied to a transmitter and receiver comprising more than two transmit and receive antennas respectively. Also, although the communications described below use OFDM, it would be appreciated by a person skilled in the art that other single carrier and multicarrier transmission techniques may be used. In the description below, a new data stream refers to a data stream which has not been previously transmitted while a retransmission data stream refers to a data stream which is retransmitted based on previously transmitted data streams.

Figure 1:
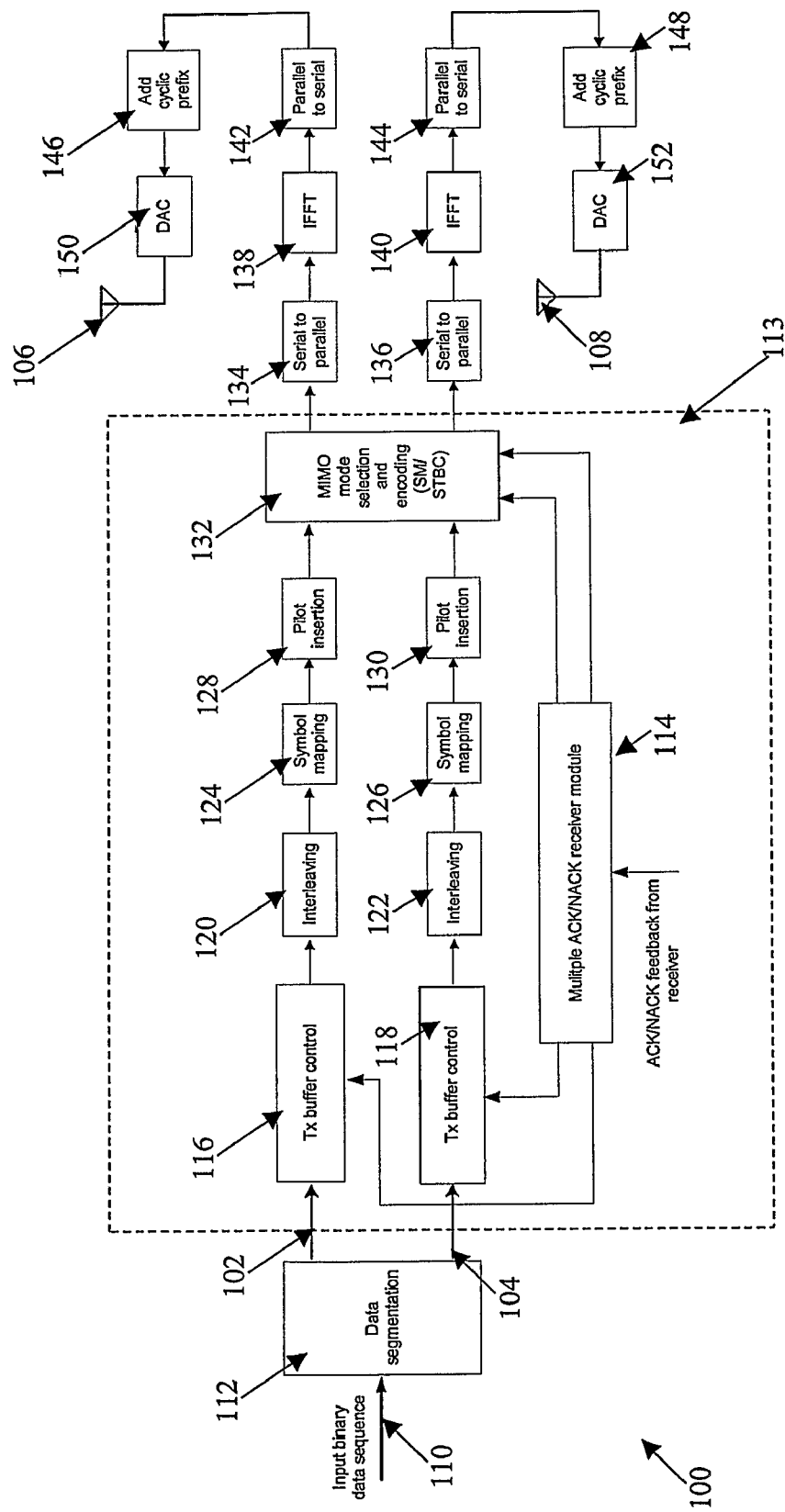
FIG. 1 is a schematic modular diagram of a transmitter in a MIMO system.

FIG. 1 is a schematic modular diagram of the MIMO system transmitter 100. Data processing is performed for each antenna chain 102, 104 and different data streams are transmitted from the transmitter 100 using transmit antennas 106, 108. In the example implementation, an antenna dependent HARQ scheme is used.

At the transmitter 100, an input binary data sequence indicated at numeral 110 is input into a data segmentation module 112. The input binary data sequence is segmented into two new data streams by the data segmentation module 112 to be transmitted over the transmit antennas 106, 108. The data segmentation module 112 is coupled to a transmitter control module 113. The transmitter control module 113 comprises a multiple ACK/NACK receiver module 114, transmitter buffer control modules 116, 118 coupled to the multiple ACK/NACK receiver module 114, interleaving modules 120, 122 coupled to the transmitter buffer control modules 116, 118 respectively, symbol mapping modules 124, 126 coupled to the interleaving modules 120, 122 respectively, pilot insertion modules 128, 130 coupled to the symbol mapping modules 124, 126 respectively and a MIMO mode selection and MIMO encoding module 132 coupled to the pilot insertion modules 128, 130 and coupled to the multiple ACK/NACK receiver module 114.

The multiple ACK/NACK receiver module 114 is provided to receive ACK/NACK signals associated with previously transmitted data streams which are fed back from the receiver (not shown) to the transmitter 100. The ACK/NACK feedback signals are transmitted by the receiver (not shown) over control channels. The multiple ACK/NACK receiver module 114 monitors the control channels and decodes the ACK/NACK feedback signals. Each segmented data stream from the data segmentation module 112 and its respective HARQ status comprising ACK/NACK signals received at the multiple ACK/NACK receiver module 114 for the respective data streams transmitted over transmit antenna 106 or 108 are sent to the respective transmitter buffer control module 116 or 118. At the transmitter buffer control modules 116, 118, depending on whether a new data stream or a retransmission data stream is to be transmitted, different processes are carried out.

If a new data stream is to be transmitted, the respective transmitter buffer control module 116 or 118 receives a new input data stream from the data segmentation module 112, performs a CRC attachment process on the data stream, channel encodes the data stream using a turbo encoder (not shown) and updates a transmission buffer (not shown). The functions of the transmitter buffer control module 116 or 118 when an ACK signal is received are described in detail below with reference to FIG. 3(a). On the other hand, if a retransmission data stream is to be transmitted, the respective transmitter buffer control module 116 or 118 extracts the relevant data from the transmission buffer (not shown) for generating the retransmission data stream. The functions of the transmitter buffer control module 116 or 118 when a NACK signal is received are described in detail below with reference to FIG. 3(b).

The data streams output from the transmitter buffer control modules 116, 118 (either new or for retransmission) are sent to the interleaving modules 120, 122 for an interleaving operation. The interleaving modules 120, 122 are used to reorder data bits of data streams so that burst errors in the data streams may be reduced. The data streams are output from the interleaving modules 120, 122 to the symbol mapping modules 124, 126. The symbol mapping modules 124, 126 carry out bit-to-symbol mapping on the interleaved data streams based on various modulation schemes such as Multiple Phase-Shift Keying (MPSK) and M-ary Quadrature Amplitude Modulation (MQAM). The data streams are output from the symbol mapping modules 124, 126 to the pilot insertion modules 128, 130. The pilot insertion modules 128, 130 insert pilot signals in the data streams to assist in channel estimation and synchronization for MIMO OFDM at the receiver (not shown).

After inserting the pilot signals and before OFDM modulation processes take place, the data streams are sent to the MIMO mode selection and encoding module 132. The MIMO mode selection and encoding module 132 selects a MIMO transmission mode (either SM or STBC) for transmitting the data streams based on the ACK/NACK feedback signals received at the multiple ACK/NACK receiver module 114. The MIMO mode selection and encoding module 132 also performs MIMO encoding of the data streams based on the selected MIMO transmission mode. An implementation of the MIMO mode selection and encoding module 132 is described below with reference to FIG. (4).

After the MIMO encoding, each of the data streams in a serial format is divided into data blocks of size N, where N is the number of subcarriers used in OFDM systems. The MIMO mode selection and encoding module 132 outputs the data blocks in a serial format to serial to parallel conversion modules 134, 136 to convert the data streams per block into a parallel format. After the conversion, the data streams are output to a N-point Inverse Fast Fourier Transform (IFFT) modules 138, 140. N-point IFFT operations are carried out by the IFFT modules 138, 140 on the data streams per block. The data streams per block are output from the IFFT modules 138, 140 to parallel to serial conversion modules 142, 144 to convert the data streams into a serial time domain format. After converting the data streams into the serial format, the data streams per block are output to cyclic prefix attachment modules 146, 148. At the cyclic prefix attachment modules 146, 148, cyclic prefixes are appended to the beginning of each block and form OFDM symbols. The cyclic prefixes are used to overcome inter-symbol interference induced by the multipath fading channel over which the OFDM symbols are transmitted. After attaching the cyclic prefixes, the cyclic prefix attachment modules 146, 148 output the data streams to Digital-to-Analogue (DAC) converters 150, 152 to convert the digital data streams into analogue signals. The analogue signals are transmitted by the respective transmit antennas 106, 108.

Figure 2:
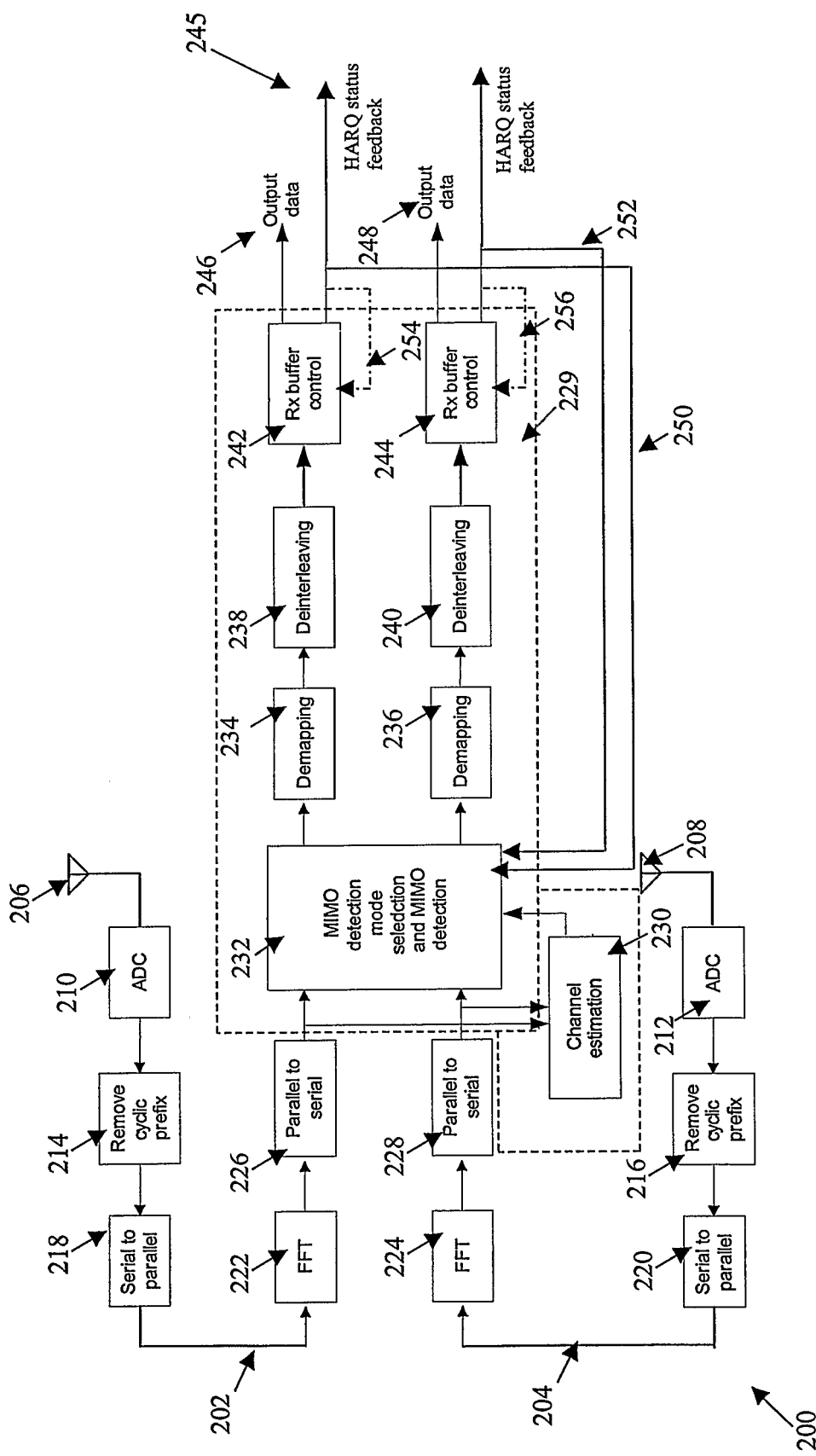
FIG. 2 is a schematic modular diagram of a receiver in the MIMO system.

FIG. 2 is a schematic modular diagram of the MIMO system receiver 200. Signal processing is performed for each antenna chain 202, 204. Analogue signals are received from receive antennas 206, 208 and converted to digital signals by respective Analogue-to-Digital (ADC) converters 210, 212. Assuming that the OFDM timing and frequency synchronization have been achieved by a timing and frequency synchronizer (not shown), the MIMO system receiver 200 determines the start and the end of one OFDM symbol. The data streams per OFDM symbol are output to cyclic prefixes removal modules 214, 216 which remove cyclic prefixes from the OFDM symbols and form data blocks of size N. The data streams per block are output from the cyclic prefixes removal modules 214, 216 to serial-to-parallel conversion modules 218, 220 to convert the data streams into a parallel format. The data streams in parallel format are output to N-point Fast Fourier transform (FFT) operations modules 222, 224. The FFT operations modules 222, 224 perform N-point FFT operations on the data streams and send the resultant data streams to parallel-to-serial conversion modules 226, 228. The parallel-to-serial conversion modules 226, 228 convert the data streams into a serial format.

The parallel-to-serial conversion modules 226, 228 are coupled to a receiver control module 229. The receiver control module 229 comprises a channel estimation module 230, a MIMO detection mode selection and MIMO detection module 232, demapping modules 234, 236, deinterleaving modules 238, 240 and receiver buffer control modules 242, 244. The parallel-to-serial conversion modules 226, 228 output the data streams to the channel estimation module 230 and the channel estimation module 230 estimates the channel fading gains using pilot signals inserted in the data streams. The estimated channel gains, the HARQ status of each respective data stream and the received frequency domain data streams are received by the MIMO detection mode selection and MIMO detection module 232 from the channel estimation module 230, the receiver buffer control modules 242, 244 and the parallel-to-serial conversion modules 226, 228 respectively. Based on the HARQ statuses, the MIMO detection mode selection and MIMO detection module 232 determines whether a VBLAST or a STBC detector is used to detect the data streams.

The MIMO detection mode selection and MIMO detection module 232 detects the transmitted data streams transmitted from each transmit antenna of the transmitter 100 (FIG. 1). The detection method is based on the MIMO transmission mode used by the transmitter 100 (FIG. 1). If the SM mode is used, a VBLAST detection method can be applied and if an orthogonal STBC mode is used, a linear STBC decoding method can be applied. An implementation of the MIMO mode selection and encoding module 232 is described below with reference to FIGS. 7(a) to (c). An estimate of each transmitted data stream obtained at the MIMO detection mode selection and MIMO detection module 232 is provided to the respective demapping modules 234 or 236 such that an estimate of each transmission bit (i.e. each soft-bit) of the detected data streams is provided. These soft-bits are deinterleaved by the deinterleaving modules 238, 240 so that the reordering of the data streams performed at the interleaving modules 120, 122 at the transmitter (FIG. 1) can be reversed.

These resultant signals are then provided to the receiver buffer control modules 242, 244 for turbo decoding and CRC validation. As would be appreciated by a person skilled in the art, although turbo code is used in the example implementation, the channel code may be extended to other codes (e.g. low density parity check code). Depending on the HARQ statuses of previous decoded data streams, different processings are carried out. The functions of the receiver control module 242 or 244 are described in detail below with reference to FIG. 8(a) and FIG. 8(b).

At the receiver buffer control modules 242, 244, if a turbo decoded data stream is successfully validated using the CRC validation, an ACK feedback signal is sent back to the transmitter 100 (FIG. 1) and a new data stream is then transmitted from the transmitter 100. On the other hand, if a turbo decoded data stream fails the CRC validation, a NACK feedback signal is sent back to the transmitter 100 (FIG. 1) to request for a retransmission of the data stream. The ACK/NACK signals are transmitted by the receiver 200 over control channels as indicated at numeral 245. The CRC validated data streams are then output as indicated at numerals 246, 248 from the receiver buffer control modules 242, 244.

The ACK/NACK signals output from the receiver buffer control modules 242, 244 are provided to the MIMO detection mode selection and MIMO detection module 232 as indicated at numerals 250, 252 for assistance in MIMO mode selection (e.g. VBLAST mode, STBC decoding mode) and MIMO detection. The feedback signals are also provided to the receiver buffer control modules 242, 244 as indicated at numerals 254, 256 for assistance in channel decoding and CRC validation, e.g. the soft-bits from the deinterleaving modules 238, 240 in multiple transmissions may be combined for turbo decoding.

After broadly describing the transmitter 100 (FIG. 1) and the receiver 200, details of the example implementation are described below.

In the example implementation, determination of whether a new data stream or a retransmission data stream is to be transmitted at the transmitter 100 (FIG. 1) is based on the ACK/NACK feedback signals for the data streams previously transmitted from the transmitter 100 (FIG. 1) received at the respective transmitter buffer control module 116 or 118 (FIG. 1) from the receiver 200 via the multiple ACK/NACK receiver module 114 (FIG. 1).

For describing the transmitter buffer control modules 116, 118, FIGS. 3(a) and (b) below are described in relation to the transmitter buffer control module 116 only. The transmitter buffer control module 118 performs in substantially the same way as the transmitter buffer control module 116.

Figure 3A:
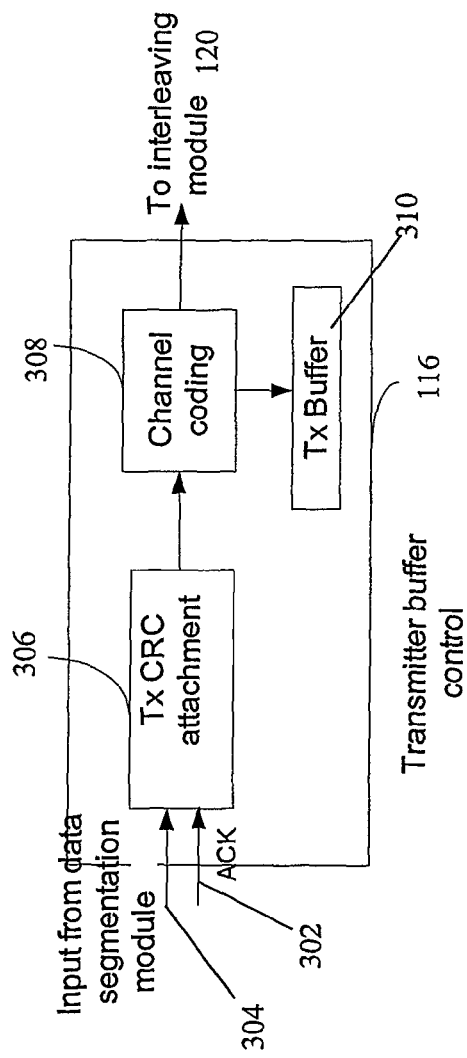
FIG. 3(a) is a schematic block diagram illustrating a transmitter buffer control module in a state of preparing a new data stream.

FIG. 3(a) is a schematic block diagram illustrating the transmitter buffer control module 116 in a state of preparing a new data stream. The transmitter buffer control module 116 goes into this state when an ACK feedback signal (at numeral 302) is received for a transmit antenna 106 or 108 (FIG. 1). When the ACK signal 302 is received, the transmitter buffer control module 116 receives a new data stream 304 from the data segmentation module 112 and performs the CRC attachment on the new data stream 304 using a CRC attachment module 306. The CRC attached data stream is encoded by a channel encoder 308 where additional redundancy is provided by adding extra data bits to the input data stream.

As described above with reference to FIG. 1, the channel encoder 308 in the example implementation is a turbo encoder. Although a turbo encoder is described for use in the channel encoding, it would be appreciated by a person skilled in the art that other encoding devices may also be used. Different redundancy versions (e.g. 3 RV versions) may be constructed from the output of the encoder, e.g. RV0 contains the system bits and some parity check bits, while RV1 and RV2 contains different parity check bits only. The data of all the RVs are stored in the transmitter buffer 310.

In the transmission of the new data stream, the data of the RV containing system information and some parity information (i.e. RV0) is provided to the interleaving module 120. The other RVs may be used for possible retransmissions. In retransmissions, depending on the protocol used (e.g. Chase combining protocol or IR protocol), different RVs may be extracted from the transmitter buffer 310 for processing.

Figure 3B:
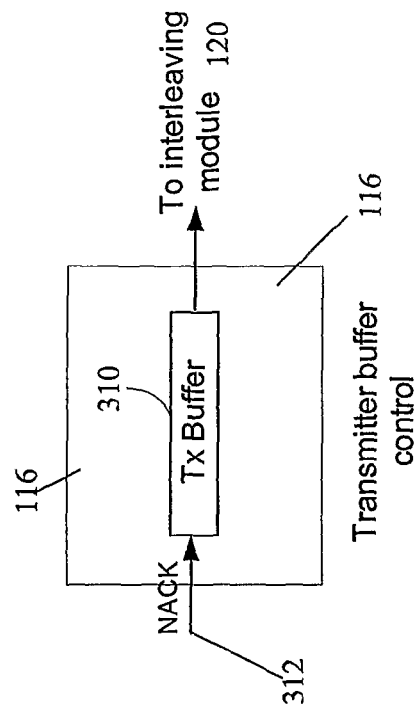
FIG. 3(b) is a schematic block diagram illustrating the transmitter buffer control module in a state of preparing a retransmission data stream.

FIG. 3(b) is a schematic block diagram illustrating the transmitter buffer control module 116 in a state of preparing a retransmission data stream. The transmitter buffer control module 116 goes into this state when a NACK feedback signal (at numeral 312) is received for a transmit antenna 106 or 108 (FIG. 1). In this state, instead of receiving a new data stream from the data segmentation module 112, the transmitter buffer control module 116 extracts the relevant data for retransmission from the transmitter buffer 310 and outputs the retransmission data to the interleaving module 120.

In the example implementation, besides providing the multiple ACK/NACK feedback signals to the transmitter buffer control modules 116, 118 (FIG. 1), the multiple ACK/NACK receiver module 114 (FIG. 1) also provides the multiple ACK/NACK feedback signals to the MIMO mode selection and MIMO encoding module 132 (FIG. 1) for selection of the transmission mode. (see FIG. 1)

Figure 4:
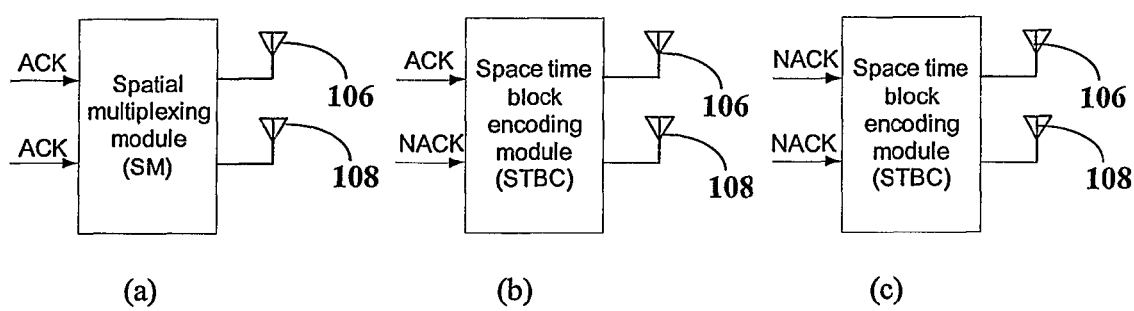
FIG. 4(a) is a schematic diagram illustrating selection of a SM transmission mode based on ACK/NACK feedback signals.
FIG. 4(b) is a schematic diagram illustrating selection of a STBC transmission mode based on ACK/NACK feedback signals.
FIG. 4(c) is a schematic diagram illustrating another selection of a STBC transmission mode based on ACK/NACK feedback signals.

FIG. 4(a) is a schematic diagram illustrating selection of a SM transmission mode when ACK signals are fed back for both of the data streams previously transmitted from the transmitter 100 (FIG. 1). Using the SM transmission mode may improve system capacity.

FIG. 4(b) is a schematic diagram illustrating selection of a STBC transmission mode when a NACK signal is fed back for one of the previously transmitted data streams to the transmitter 100 (FIG. 1).

FIG. 4(c) is a schematic diagram illustrating selection of a STBC transmission mode when NACK signals are fed back for the previously transmitted data streams to the transmitter 100 (FIG. 1).

At the MIMO mode selection and MIMO encoding module 132 (FIG. 1), besides selecting the transmission mode, the MIMO mode selection and MIMO encoding module 132 (FIG. 1) also processes the data streams received from the transmitter buffer control modules 116, 118.

In the following description, different processings performed by the MIMO mode selection and MIMO encoding module 132 based on different system configurations of the MIMO system transmitter 100 (FIG. 1) are described. As discussed previously, the transmitter 100 (FIG. 1) and the receiver 200 (FIG. 2) of the MIMO system may be configured to comprise two or more transmit and receive antennas respectively.

Figure 5A:
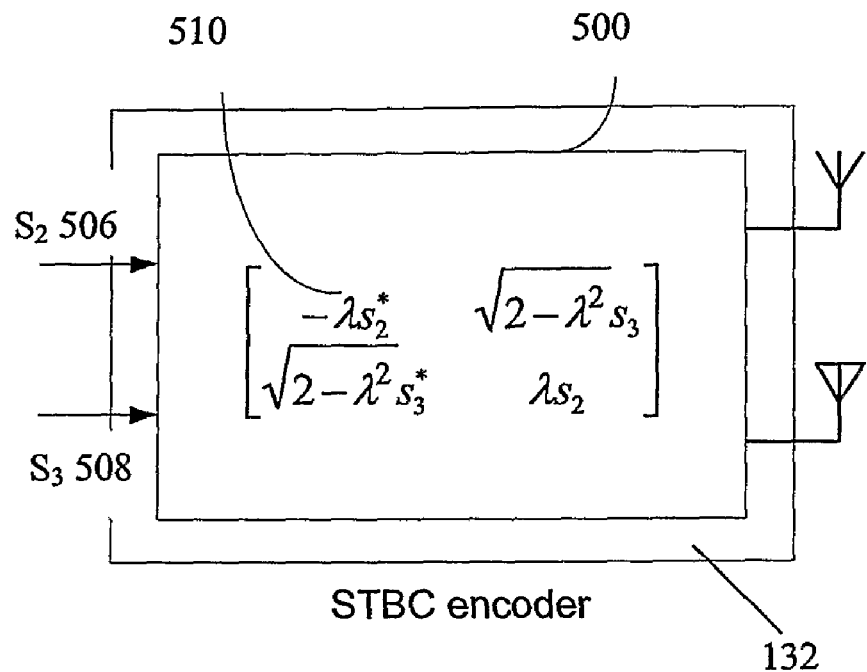
FIG. 5(a) is a schematic diagram illustrating a (2×2) MIMO system configuration in a scenario of transmitting one retransmission data stream.

FIG. 5(a) is a schematic diagram illustrating a (2×2) MIMO system configuration with two transmit antennas and two receive antennas in a scenario of transmitting one retransmission data stream. It is assumed that in the original transmission (not shown), two data streams, $s_1$ (not shown) and $s_2$, were transmitted. The data stream $s_1$ (not shown) has been successfully validated at the receiver 200 (FIG. 2) and an ACK feedback signal is sent to the transmitter 100 (FIG. 1) while a data stream $s_2$ fails the CRC validation and a retransmission for $s_2$ is required. In the retransmission, a retransmission data stream $s_2$ 506 is transmitted. A new data stream $s_3$ 508 and the retransmission data stream $s_2$ 506 are STBC encoded by an encoding module 500 in the MIMO mode selection and encoding module 132 before transmission. As would be appreciated by a person skilled in the art, the STBC encoding may provide both time and space diversity to the transmission of $s_3$ 508 and $s_2$ 506 to improve transmission quality.

At the encoding module 500, the retransmission data stream $s_2$ 506 is multiplied by a weighting factor $\lambda (1 \leq \lambda \leq 2)$ and the new data stream $s_3$ 508 is multiplied by a weighting factor $\sqrt{2-\lambda^2}$, see mathematical matrix 510.

The selection of $\lambda$ is performed using either an open loop mode or a closed loop mode. In the open loop mode, a predefined value is assigned to $\lambda$ regardless of the link conditions between the transmitter 100 (FIG. 1) and the receiver 200 (FIG. 2). For example, $\lambda=1.5$ may be assigned to favour the retransmission of $s_2$ 506. In the closed loop mode, $\lambda$ can be selected based on the link conditions. For example, $\lambda=snr_1/snr_2$, where $snr_1$ and $snr_2$ are the ratios of signal power to noise power (SNRs) measured at the receiver 200 (FIG. 2) for the originally transmitted data stream $s_1$ (not shown) and the data stream $s_2$ 506 respectively, after being detected at the receiver 200 (FIG. 2).

With the weighting operation and STBC encoding at the MIMO mode selection and encoding module 132 at the transmitter 100 (FIG. 1), at the receiver 200 (FIG. 2), the STBC detected $s_2$ 506 and $s_3$ 508 at the receiver 200 (FIG. 2) ie. $\hat{s}_2$ and $\hat{s}_3$ are given as $$\hat{s}_2 = \frac{h_{12}^* r_1(1) - h_{11} r_1^*(2) + h_{22}^* r_2(1) - h_{21} r_2^*(2)}{\lambda(|h_{11}|^2 + |h_{21}|^2 + |h_{12}|^2 + |h_{22}|^2)} \quad (1)$$

$$\hat{s}_3 = \frac{h_{11}^* r_1(1) + h_{12} r_1^*(2) + h_{21}^* r_2(1) + h_{22} r_2^*(2)}{\sqrt{2-\lambda^2}(|h_{11}|^2 + |h_{21}|^2 + |h_{12}|^2 + |h_{22}|^2)} \quad (2)$$

where $h_{ij}, i, j \in \{1,2\}$ is the fading gain of the channel from the $j^{th}$ transmitter antenna to the $i^{th}$ receiver antenna. $r_i(k)$, $i$, $k \in \{1,2\}$ denotes the signal received over the $i^{th}$ antenna at the $k^{th}$ time instant. The SNRs of $s_2$ 506 and $s_3$ 508 are given as $$snr_2 = \lambda^2(|h_{11}|^2 + |h_{21}|^2 + |h_{12}|^2 + |h_{22}|^2)\frac{\sigma_s^2}{\sigma_n^2} \quad (3)$$

$$snr_3 = (2-\lambda^2)(|h_{11}|^2 + |h_{21}|^2 + |h_{12}|^2 + |h_{22}|^2)\frac{\sigma_s^2}{\sigma_n^2} \quad (4)$$

where $\sigma_s^2$, and $\sigma_n^2$ are symbol energy and noise variance of additive white Gaussian noise (AWGN) respectively.

In the example implementation, selection of the $\lambda$ value affects the SNRs as reflected in equations (3) and (4). For example, a higher SNR for the retransmission data stream $s_2$ 506 may be obtained using a larger $\lambda$ value. This may result in the retransmission data stream $s_2$ 506 being received and decoded successfully at the receiver 200 (FIG. 2).

Figure 5B:
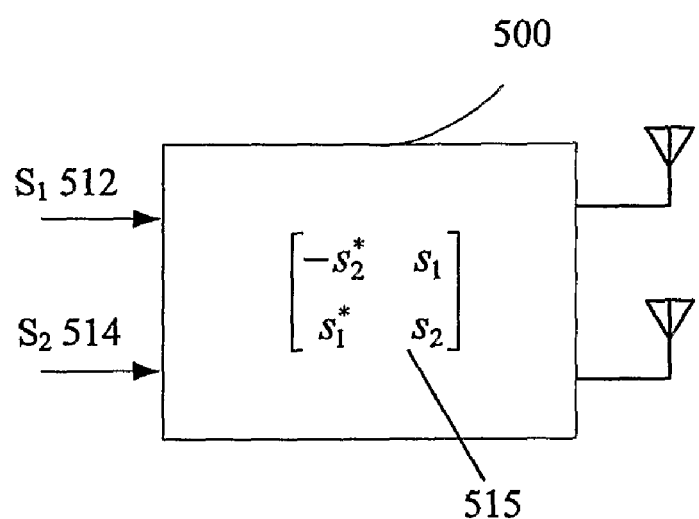
FIG. 5(b) is a schematic diagram illustrating the (2×2) MIMO system configuration in a scenario of transmitting two retransmission data streams.

FIG. 5(b) is a schematic diagram illustrating the (2×2) MIMO system configuration in a scenario of transmitting two retransmission data streams. In this scenario, two NACK feedback signals are received for both the previously transmitted data streams in the MIMO system so that two retransmission data streams $s_1$ 512 and $s_2$ 514 are to be transmitted. The value of $\lambda=1$ is assigned so that both $s_1$ 512 and $s_2$ 514 have equal transmission power, as shown in mathematical matrix 515.

As would be appreciated by a person skilled in the art, although using the STBC transmission mode typically improves the transmission reliability of the transmission data streams, the example implementation may provide a higher SNR for retransmission data streams. A higher SNR may reduce the number of retransmissions required and may therefore improve the system throughput of the MIMO system.

Figure 6A:
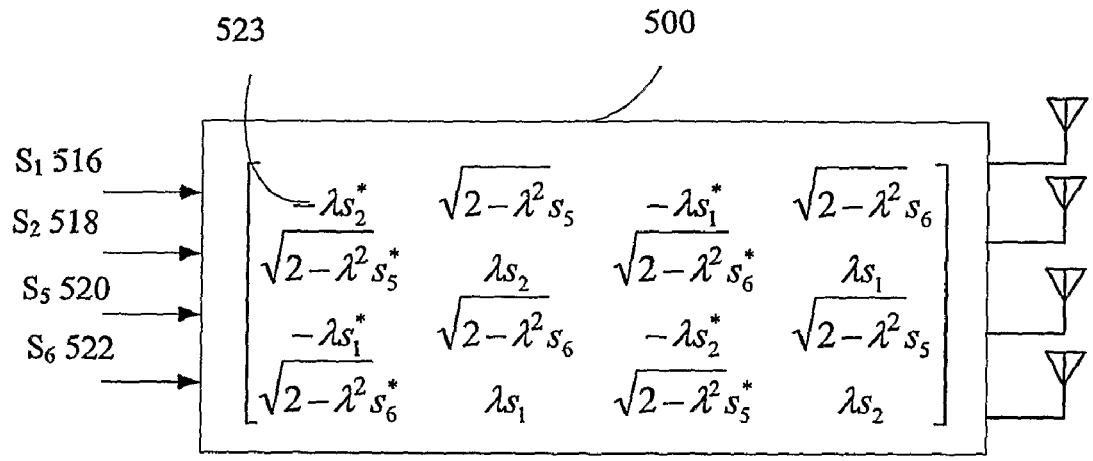
FIG. 6(a) is a schematic diagram illustrating a (4×4) MIMO system configuration in a first scenario of transmitting two retransmission data streams.

FIG. 6(a) is a schematic diagram illustrating a (4×4) MIMO system configuration with four transmit antennas and four receive antennas in a first scenario of retransmitting two data streams. Two retransmission data streams $s_1$ 516 and $s_2$ 518 and two new data streams $s_5$ 520 and $s_6$ 522 form a rate one non-orthogonal STBC code for transmission, see mathematical matrix 523. As will be appreciated by a person skilled in the art, the value of λ affects the SNRs since using the weighting operation is equivalent to allocating different transmission powers to retransmission data streams and new data streams. Therefore, providing higher transmission powers for the retransmission data streams result in higher SNRs.

Figure 6B:
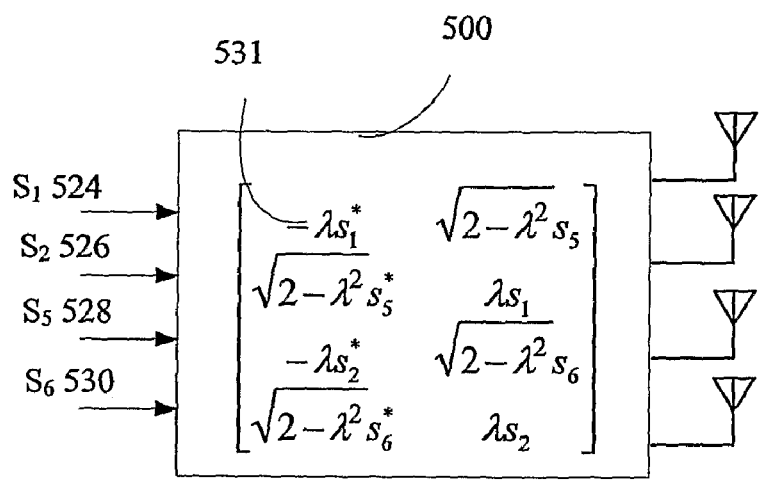
FIG. 6(b) is a schematic diagram illustrating the (4×4) MIMO system configuration in a second scenario of transmitting two retransmission data streams.

FIG. 6(b) is a schematic diagram illustrating the (4×4) MIMO system configuration in a second scenario of retransmitting two data streams. A retransmission data stream $s_1$ 524 and a new data stream $s_5$ 528 form a first STBC code while a retransmission data stream $s_2$ 526 and a new data stream $s_6$ 530 form a second STBC code, see mathematical matrix 531. As described above, the value of λ affects the SNRs since using the weighting operation is equivalent to allocating different transmission powers to retransmission data streams and new data streams. Therefore, providing higher transmission powers for the retransmission data streams result in higher SNRs.

As would be appreciated by a person skilled in the art, compared to the first scenario for the (4×4) MIMO system configuration, the second scenario forms a rate two STBC code and may reduce any transmission delay at a tradeoff of transmission quality.

Figure 6C:
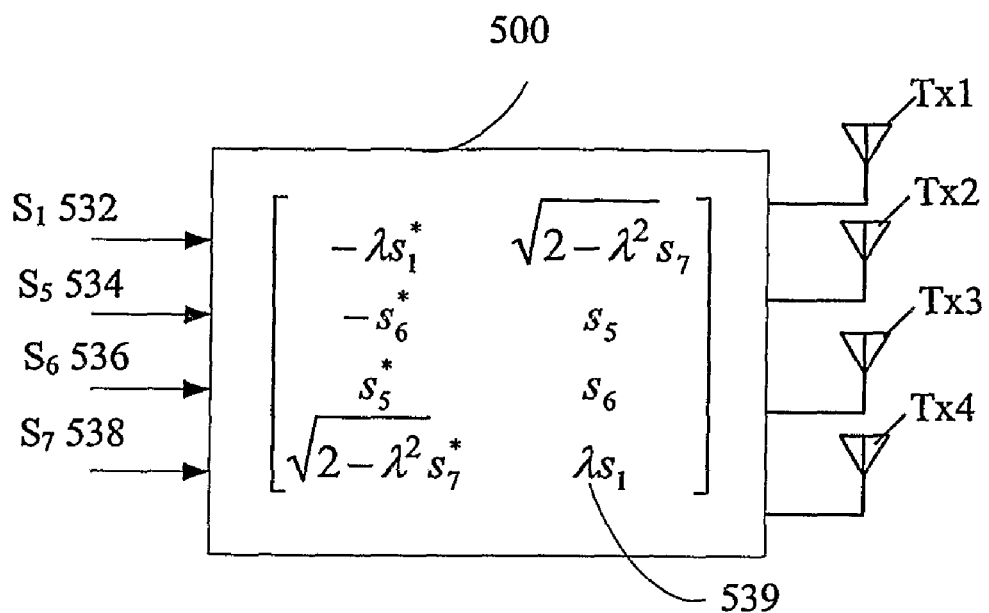
FIG. 6(c) is a schematic diagram illustrating the (4×4) MIMO system configuration in a scenario of transmitting one retransmission data stream.

FIG. 6(c) is a schematic diagram illustrating the (4×4) MIMO system configuration in a scenario of retransmitting one data stream. A retransmission data stream $s_1$ 532 and with a new data stream $s_7$ 538 form a first STBC code while two new data streams $s_5$ 534 with $s_6$ 536 form a second STBC code, see mathematical matrix 539. In this scenario, with consideration of spatial correlation between antennas, e.g. a linear antenna array (Tx1 to Tx4) in the example implementation as shown in FIG. 6(c), $s_1$ 532 is encoded with $s_7$ 538 to form the first STBC code, because Tx4 has the least spatial correlation with the transmit antenna Tx1 over which the original transmission of $s_1$ was transmitted and a NACK feedback signal was received for $s_1$.

Figure 6D:
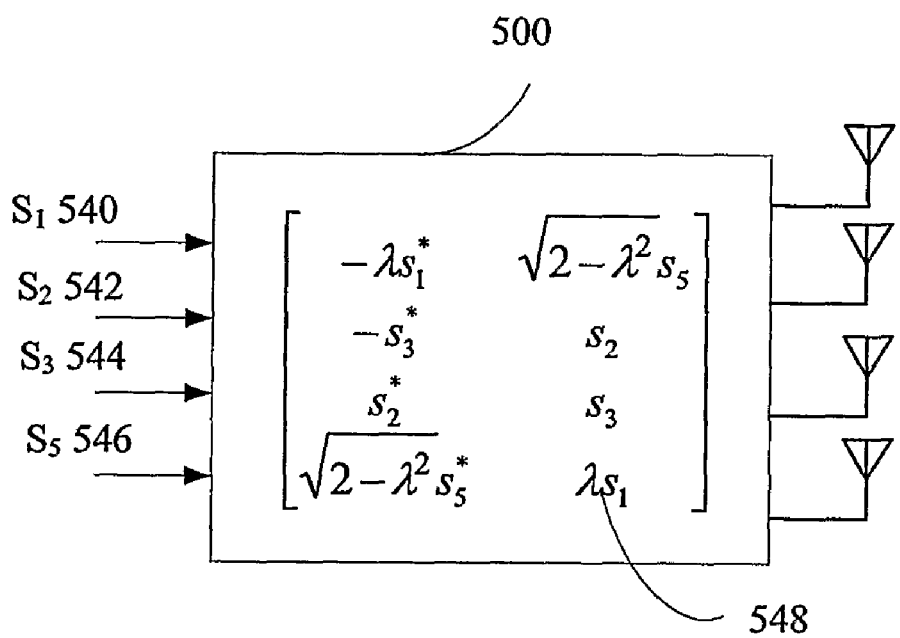
FIG. 6(d) is a schematic diagram illustrating the (4×4) MIMO system configuration in a scenario of transmitting three retransmission data streams.

FIG. 6(d) is a schematic diagram illustrating the (4×4) MIMO system configuration in a scenario of retransmitting three data streams. In this scenario, three NACK feedback signals are received in the MIMO system. The retransmission data stream $s_1$ 540, and new data stream $s_5$ 546 form one STBC code with ($1 \leq \lambda \leq 2$), while the retransmission data streams $s_2$ 542 and $s_3$ 544 form another STBC code with $\lambda=1$ (not shown), see mathematical matrix 548.

After describing details of the transmitter 100 (FIG. 1), the data stream detection at the MIMO detection mode selection and MIMO detection module 232 (FIG. 2) and the processes at the receiver control modules 242, 244 (FIG. 2) of the receiver 200 (FIG. 2) are described respectively below. As described briefly above, the MIMO detection mode selection and MIMO detection module 232 (FIG. 2) detects and separates the multiple data streams received at the receiver 200 (FIG. 2) into respective independent data streams.

Figure 7:
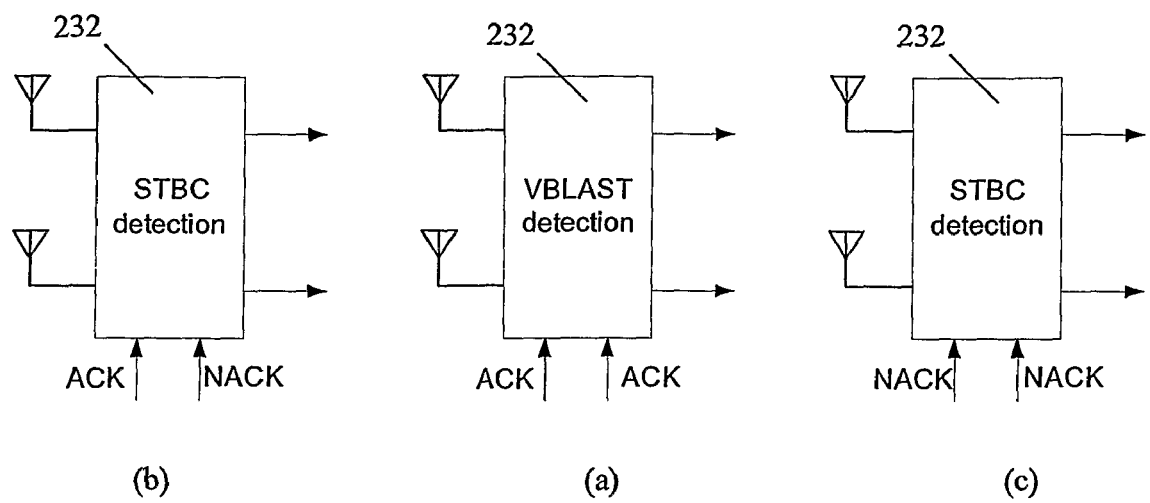
FIGS. 7(a) to (c) are schematic diagrams illustrating detection modes selection methods at a MIMO detection mode selection module.

FIGS. 7(a) to (c) are schematic diagrams illustrating the MIMO detection methods at the MIMO detection mode selection and MIMO detection module 232. The detection methods are chosen based on the HARQ status feedback signals of previously received data streams. The MIMO detection function is to detect and separate the multiple received data streams into independent transmitted data streams using detection methods, for example VBLAST or STBC detection methods.

In FIG. 7(a), if the MIMO detection mode selection and MIMO detection module 232 receives two ACK feedback signals from the receiver control modules 242, 244 (FIG. 2), the MIMO detection mode selection and MIMO detection module 232 uses a VBLAST detector discussed in the Background section to detect and separate the data streams. (compare FIG. 4(a))

In FIG. 7(b), if the MIMO detection mode selection and MIMO detection module 232 receives an ACK feedback signal and a NACK feedback signal from the receiver control modules 242, 244 (FIG. 2), the MIMO detection mode selection and MIMO detection module 232 uses a STBC detector to detect and separate the data streams. (compare FIG. 4(b))

In FIG. 7(c), if the MIMO detection mode selection and MIMO detection module 232 receives two NACK feedback signals from the receiver control modules 242, 244 (FIG. 2), the MIMO detection mode selection and MIMO detection module 232 uses the STBC detector to detect and separate the data streams. (compare FIG. 4(c))

As an example, for a scenario where an ACK feedback signal and a NACK feedback signal is received (see FIG. 7(b)), the detected signals (see FIG. 5(a)) are given as shown in equations (1) and (2) given above.

The processes at the receiver buffer control modules 242, 244 (FIG. 2) of the receiver 200 (FIG. 2) are now described in detail below.

For description purposes, FIGS. 8(a) and (b) below are described in relation to the receiver buffer control module 242 only. The receiver buffer control module 244 performs in substantially the same way as the receiver buffer control module 242.

Figure 8A:
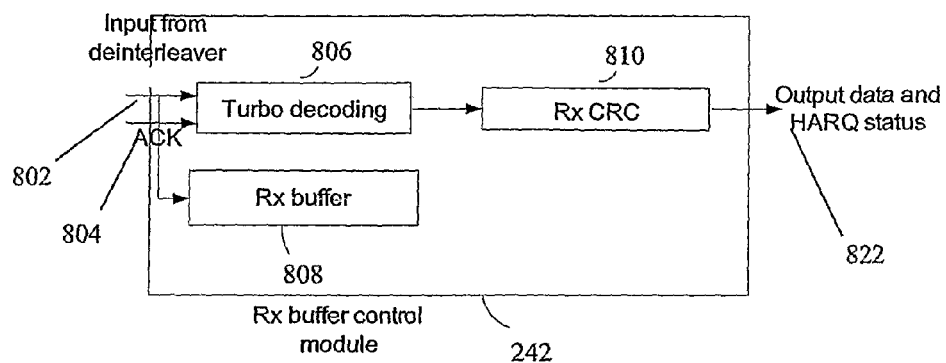
FIG. 8(a) is a schematic block diagram illustrating a state of receiving a new data stream at one receiver buffer control module.

FIG. 8(a) is a schematic block diagram illustrating the receiver buffer control module 242 in a state of receiving a new data stream 802. The receiver buffer control module 242 goes into this state when an ACK feedback signal 804 with respect to a previously received data stream is received as self-feedback at the receiver buffer control module 242. The receiver buffer control module 242 receives the new data stream 802 from the deinterleaving module 238 (FIG. 2) and sends the new data stream 802 to a turbo decoder 806 to decode the new data stream 814. The receiver buffer control module 242 also sends the new data stream 802 to update buffer contents of a receiver buffer 808 for an event if a future data stream combination is required. After the turbo decoding, the decoded data stream is output to a CRC validation module 810 for CRC validation. If the CRC validation is successful, an ACK feedback signal with regards to the new data stream 802 is sent to the transmitter 100 (FIG. 1) to acknowledge correct reception of the data stream. Otherwise, if the CRC validation is unsuccessful, a NACK feedback signal is sent to the transmitter 100 (FIG. 1) to request for a retransmission based on the data stream 802.

Figure 8B:
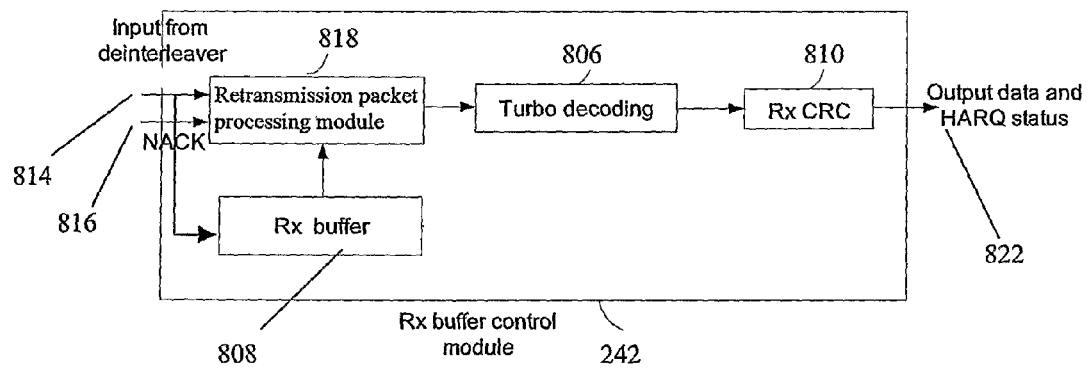
FIG. 8(b) is a schematic block diagram illustrating a state of receiving a retransmission data stream at the receiver buffer control module.

FIG. 8(b) is a schematic block diagram illustrating the receiver buffer control module 242 in a state of receiving a retransmission data stream 814. The receiver buffer control module 242 goes into this state when a NACK feedback signal 816 with respect to a previously received data stream is received as self-feedback at the receiver buffer control module 242. The receiver buffer control module 242 receives the retransmission data stream 814 from the deinterleaving module 238 (FIG. 2). The receiver buffer control module 242 then sends the retransmitted data stream to both a retransmission packet processing module 818 and the receiver buffer 808 which stores the retransmitted data stream for an event if a future data stream combination is required. The receiver buffer control module 242 activates the retransmission packet processing module 818 which interacts with the receiver buffer 808 to perform a combining operation. The combining operation comprises combining the retransmission data stream 814 with the previously received data streams stored in the receiver buffer 808. The output of the retransmission packet processing module 818 is sent to the turbo decoder 806 for decoding. After the turbo decoding, the turbo decoder 806 sends the decoded data stream to the CRC validation module 810 to perform CRC validation based on the decoded data stream. If the CRC validation is successful, an ACK feedback signal with regards to the retransmission data stream 814 is sent to the transmitter 100 (FIG. 1) to acknowledge correct reception of the data stream. Otherwise, if the CRC validation is unsuccessful, a NACK feedback signal is to the transmitter 100 (FIG. 1) to request for a further retransmission.

From FIGS. 8(*a*) and (*b*), the ACK/NACK feedback signals and the data streams if the CRC validations are successful are output from the receiver buffer control module 242, as indicated at numeral 822. The outputs of the receiver buffer control modules 242, 244 are correspondingly indicated at numerals 246, 248 respectively in FIG. 2. If a decoded data stream is successfully validated, it is sent from the receiver 200 (FIG. 2) for further processing (for example, upper layer processing). If a decoded data stream fails the CRC validation, the data stream is discarded.

In the example implementation, as described with reference to FIG. 2, the ACK/NACK feedback signals are sent to the transmitter 100 (FIG. 1), the MIMO detection mode selection and MIMO detection module 232 (FIG. 2) and as self-feedback at the receiver buffer control modules 242, 244 (FIG. 2).

Figure 9:
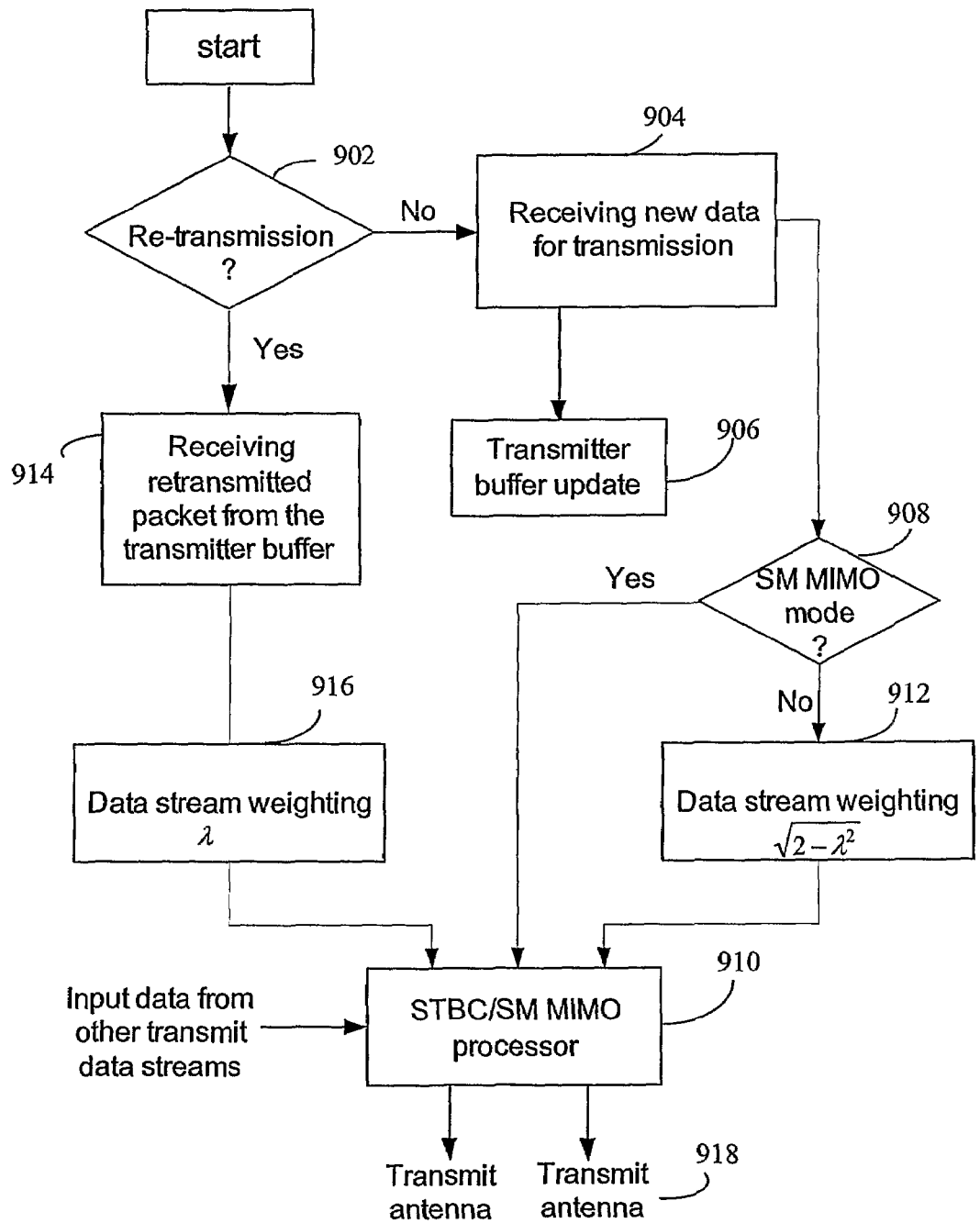
FIG. 9 is a schematic flowchart illustrating the transmitting operation of the transmitter.

FIG. 9 is a schematic flowchart illustrating the transmitting operation of a data stream of the transmitter 100 (FIG. 1). At the start of the transmitting operation at step 900, at step 902, the transmitter decides whether or not a retransmission is required. If a retransmission is not required, at step 904, the transmitter prepares a new data stream for transmission using the antenna. At step 906, the transmitter buffer associated to the data stream is updated. Based on step 904, at step 908, the transmitter determines whether the SM or STBC transmission mode is selected for the transmission based on the ACK/NACK feedback signals received from the receiver. If the SM transmission mode is selected at step 908, at step 910, the new data stream is to be transmitted without a weighting operation. If the STBC transmission mode is selected at step 908, at step 912, the new data stream undergoes a weighting operation by multiplying the weighting factor $\sqrt{2-\lambda^2}$ to the new data stream. After the weighting operation at step 912, at step 910, the processed new data stream is sent for transmission at step 910.

If a retransmission is required for the antenna at step 902, at step 914, a retransmission data stream is prepared based on the previously transmitted data stream extracted from the respective transmitter buffer. At step 916, a weighting operation is carried out on the retransmission data stream by multiplying the weighting factor $\lambda$ to the retransmission data stream. After the weighting operation at step 916, at step 910, the retransmission data stream is sent for MIMO encoding. After the MIMO encoding at step 910, the data streams of the transmitter are transmitted by the transmit antennas, as indicated at numeral 918.

The above example implementation may improve system throughput of a MIMO system based on the weighting operation and the assigned values of the weighting factors. The example implementation may provide a HARQ control system for controlling STBC encoding according to MIMO system configurations. The STBC encoding may be selected based on system configurations and performance requirements. The example implementation may exploit the retransmission diversity and transmit diversity of the MIMO system to achieve spectral efficiency.

It will be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method for retransmission of data in a multiple input multiple output (MIMO) system, the method comprising space-time block code (STBC) encoding multiple data streams including one or more retransmission data streams using a STBC matrix, the STBC matrix multiplying at least one of the retransmission data streams with respective variable weighting factors.

2. The method as claimed in claim 1, wherein the variable weighting factors are selected such that the associated retransmission data streams are given a weight equal to or greater than one in the STBC encoding.

3. The method as claimed in claim 2, wherein the STBC matrix further multiplies new data streams with respective variable weighting factors, and the variable weighting factors are selected such that the associated new data streams are given a weight less than one in the STBC encoding.

4. The method as claimed in claim 1, wherein the variable weighting factors associated with the respective retransmission data streams are selected based on link conditions between respective transmitter and receiver antenna pairs of the MIMO system.

5. The method as claimed in claim 4, wherein the weighting factors associated with the respective retransmission data streams are selected based on measured signal to noise ratios (SNRs) of originally transmitted data streams detected at a receiver.

6. The method as claimed in claim 1, wherein the STBC encoding comprises a rate one STBC code.

7. The method as claimed in claim 1, wherein the STBC encoding comprises a rate two STBC code.

8. The method as claimed in claim 1, wherein the multiple data streams include one or more retransmission data streams and one or more new transmission data streams, and the antennas used to transmit the STBC encoded data streams are selected such that the antennas are least correlated.

9. A method for receiving data in a multiple input multiple output (MIMO) system, the method comprising utilising a retransmission packet processing based on decoding space-time block code (STBC) encoded multiple data streams including one or more retransmission data streams, wherein a STBC matrix used in the STBC encoding multiplies at least one of the retransmission data streams with respective variable weighting factors.

10. A transmitter for retransmitting data in a multiple input multiple output (MIMO) system, the transmitter comprising a transmitter control module utilising space-time block code (STBC) for encoding multiple data streams including one or more retransmission data streams using a STBC matrix, the STBC matrix multiplying at least one of the retransmission data streams with respective variable weighting factors.

11. The transmitter as claimed in claim 10, wherein the transmitter control module selects the variable weighting factors such that the associated retransmission data streams are given a weight equal to or greater than one in the STBC encoding.

12. The transmitter as claimed in claim 11, wherein the STBC matrix further multiplies new data streams with respective variable weighting factors, and the variable weighting factors are selected such that the associated new data streams are given a weight less than one in the STBC encoding.

13. The transmitter as claimed in claim 10, wherein the variable weighting factors associated with the respective retransmission data streams are selected based on link conditions between respective transmitter and receiver antenna pairs of the MIMO system.

14. The transmitter as claimed in claim 13, wherein the weighting factors associated with the respective retransmission data streams are selected based on measured signal to noise ratios (SNRs) of originally transmitted data streams detected at a receiver.

15. The transmitter as claimed in claim 10, wherein the STBC encoding comprises a rate one STBC code.

16. The transmitter as claimed in claim 10, wherein the STBC encoding comprises a rate two STBC code.

17. The transmitter as claimed in claim 10, wherein the multiple data streams include one or more retransmission data streams and one or more new transmission data streams, and the antennas used to transmit the STBC encoded data streams are selected such that the antennas are least correlated.

18. A receiver for receiving data in a multiple input multiple output (MIMO) system, the receiver comprising a receiver control module for retransmission packet processing based on decoding space-time block code (STBC) encoded multiple data streams including one or more retransmission data streams, wherein a STBC matrix used in the STBC encoding multiplies at least one of the retransmission data streams with respective variable weighting factors.

* * * * *